US008280025B2

(12) United States Patent
Sharpe et al.

(10) Patent No.: US 8,280,025 B2
(45) Date of Patent: Oct. 2, 2012

(54) AUTOMATED UNIQUE CALL ANNOUNCEMENT

(75) Inventors: Timothy David Sharpe, Redmond, WA (US); Cameron Ali Etezadi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1283 days.

(21) Appl. No.: 11/824,474

(22) Filed: Jun. 29, 2007

(65) Prior Publication Data

US 2009/0003538 A1    Jan. 1, 2009

(51) Int. Cl.
*H04M 3/42* (2006.01)
(52) U.S. Cl. .............. 379/207.16; 379/142.14
(58) Field of Classification Search .............. 379/142.14
See application file for complete search history.

(56) References Cited

U.S. PATENT DOCUMENTS

| | | | |
|---|---|---|---|
| 5,526,406 A * | 6/1996 | Luneau | 455/563 |
| 5,559,860 A | 9/1996 | Mizikovsky | |
| 5,764,279 A | 6/1998 | Ford et al. | 348/15 |
| 6,122,347 A | 9/2000 | Borland | |
| 6,373,925 B1 | 4/2002 | Guercio et al. | |
| 6,529,586 B1 | 3/2003 | Elvins et al. | |
| 6,711,239 B1 | 3/2004 | Borland | |
| 6,944,277 B1 | 9/2005 | Viikki | |
| 6,970,915 B1 | 11/2005 | Partovi et al. | 709/217 |
| 7,127,238 B2 | 10/2006 | Vandermeijden et al. | |
| 7,127,400 B2 | 10/2006 | Koch | 704/270.1 |
| 7,127,403 B1 | 10/2006 | Saylor et al. | 704/275 |
| 7,142,645 B2 | 11/2006 | Lowe | |
| 7,242,754 B2 | 7/2007 | Adams et al. | 379/201.02 |
| 7,620,160 B2 | 11/2009 | Tidwell et al. | 379/88.25 |
| 7,653,380 B2 | 1/2010 | Graefen | 455/414.1 |
| 8,223,932 B2 | 7/2012 | Forbes et al. | |
| 2001/0048736 A1 | 12/2001 | Walker et al. | 379/88.23 |
| 2004/0037403 A1 * | 2/2004 | Koch | 379/142.16 |
| 2004/0081305 A1 * | 4/2004 | Gonzalez et al. | 379/207.16 |
| 2004/0218743 A1 | 11/2004 | Hussain et al. | 379/201.11 |
| 2004/0235520 A1 | 11/2004 | Cadiz et al. | |
| 2005/0117730 A1 | 6/2005 | Mullis et al. | 379/210.02 |
| 2006/0003761 A1 | 1/2006 | Fry et al. | 455/426.1 |

(Continued)

FOREIGN PATENT DOCUMENTS

WO    WO 03/052607 A1    6/2003

(Continued)

OTHER PUBLICATIONS

Drishti-Soft.Com., "PACE Ahead with DACX Ameyo," pp. 1-3, <http://www.drishti-soft.com/ivr.php>.

(Continued)

*Primary Examiner* — Alexander Jamal
(74) *Attorney, Agent, or Firm* — Merchant & Gould

(57) ABSTRACT

Automated unique call announcements for incoming telephone calls are provided. When a call is received at a mobile or wired telephone, a variety of data about the calling party, for example, caller identification and profile data for the calling party and data associated with the called party, for example, scheduling data, contacts data, and contextual data, such as time of day, may be used for generating a text-to-speech message that may be played to the called party as a unique call announcement. If desired, a standard or customized ring tone may be played before, after, or before and after presentation of the unique call announcement. In addition, voice command functionality may be provided for allowing a called party to direct a disposition of an incoming telephone call without answering the incoming telephone call.

20 Claims, 3 Drawing Sheets

U.S. PATENT DOCUMENTS

| | | | |
|---|---|---|---|
| 2006/0028951 A1 | 2/2006 | Tozun et al. | |
| 2006/0052091 A1* | 3/2006 | Onyon et al. | 455/415 |
| 2006/0104293 A1 | 5/2006 | Kopp et al. | 370/401 |
| 2006/0165050 A1 | 7/2006 | Erhart et al. | 370/351 |
| 2006/0206340 A1 | 9/2006 | Silvera et al. | 704/278 |
| 2006/0210033 A1 | 9/2006 | Grech et al. | |
| 2006/0291640 A1 | 12/2006 | Nagesh et al. | |
| 2007/0036284 A1 | 2/2007 | Raghav et al. | 379/67.1 |
| 2007/0117549 A1* | 5/2007 | Arnos | 455/414.1 |
| 2008/0034064 A1 | 2/2008 | Choi et al. | |
| 2008/0130632 A1 | 6/2008 | Leong | 370/352 |
| 2008/0275701 A1 | 11/2008 | Wu et al. | |
| 2009/0003580 A1 | 1/2009 | Sharpe et al. | 379/211.02 |
| 2009/0232288 A1 | 9/2009 | Forbes et al. | 379/93.23 |
| 2011/0231182 A1 | 9/2011 | Weider et al. | |

FOREIGN PATENT DOCUMENTS

| | | |
|---|---|---|
| WO | 2005/088990 A1 | 9/2005 |

OTHER PUBLICATIONS

Cisco Systems, "Cisco IPCC Callback Option Data Sheet," pp. 1-5, http://www.cisco.com/web/CA/events/pdfs/IPCC_Callback_Option_DS.pdf.

FileCart.com, "Xtend IVR Develop Edition 3.0," pp. 1-2, Aug. 16, 2007, http://www.filecart.com/details/30878/357/XTend_IVR_Develop_Edition.php.

CTiLabs, "Mobile Ringback Tone Service," Date: Nov. 24, 2004, pp. 1-4, http://www.ctilabs.de/de/sol/infos/ringback.pdf.

Microsoft.com/Speech/Speech2004, "Microsoft Speech Server: Features & Benefits," pp. 1-2, http://www.microsoft.com/speech/evaluation/tools/default.mspx, publicly known at least as early as Jun. 29, 2007.

3D2F.com, "CallButler Unlimited 1.0," Nov. 12, 2006, pp. 1-4, http://3d2f.com/programs/1-640-callbutler-unlimited-download.shtml.

New Telephone Speech Corpora at CSLU, 1995, pp. 1-4, http://citeseer.comp.nus.edu.sg/cache/papers/cs/2304/ftp:zSzzSzspeech.ese.ogi.eduzSzpubzSzdocszSzcorpus.devl.pdf/cole95new.pdf.

Sawhney et al., 2000, *ACM Transactions on Computer-Human Interaction*, 7(3):Sep. 2000. pp. 353-383 "Nomadic Radio: Speech and Audio Interaction for Contextual Messaging in Nomadic Environments." http://interruptions.net/literature/Sawhney-TOCH100-p353-sawhney.pdf.

U.S. Appl. No. 12/049,281, filed Mar. 15, 2008, entitled "Appending Content to a Telephone Communication". Inventors: Scott C. Forbes. Sean Olson, Jeremy Buch, Dawson Yee, Timothy Mark Moore, and Kalyan Shankar Basu.

Smarthome, "The Caller ID System That Speaks for Itself," Date: Apr. 3, 2007, pp. 1-4, http://www.smarthome.com/5154cw.html.

SoftRunner Inc., "eCaller ID™ It Speaks for Itself," Date: Apr. 3, 2007, pp. 1-5, http://softrunner.com/callerid/.

ClassCo, "More Than Caller ID—Convenience—Security—Accessibility," Date: Apr. 3, 2007, pp. 1-4, http://www.classco.com/catalog.php.

AlWorldSoft.Com., "PhoneTray Fee 1.20," Date: Apr. 3, 2007, pp. 1-2, http://www.allworldsoft.com/software/13-506-phonetray-free.htm.

U.S. Appl. No. 11/824,498, filed Jun. 29, 2007, entitled "Mobile Telephone Interactive Call Disposition System", Inventors: Timothy D. Sharpe and Cameron Ali Etezadi.

Office Action mailed Sep. 30, 2010, in co-pending U.S. Appl. No. 11/824,498.

U.S. Final Office Action cited in U.S. Appl. No. 11/824,498 mailed May 6, 2011, 23 pgs.

U.S. Final Office Action cited in U.S. Appl. No. 11/824,498 mailed May 6, 2011.

U.S. Office Action mailed Nov. 23, 2011 in U.S. Appl. No. 12/049,281, 13 pages.

* cited by examiner

AUTOMATED UNIQUE CALL ANNOUNCEMENT

RELATED CASE

This application is related to U.S. patent application Ser. No. 11/824,498, filed Jun. 29, 2007 and entitled "MOBILE TELEPHONE INTERACTIVE CALL DISPOSITION SYSTEM," and to U.S. patent application Ser. No. 12/049,281, filed Mar. 15, 2008, and entitled "APPENDING CONTENT TO A TELEPHONE COMMUNICATION," which applications are hereby incorporated by reference.

BACKGROUND

In modern mobile and wired telephones, methods and systems are used for identifying a calling party. For example, a text-based caller identification may be displayed in a screen on a telephone to allow a called party to see an identification of a calling party before a telephone call is answered. A text-to-speech (TTS) system may be used to speak aloud a name presented in a caller identification field in association with a calling party. Some telephones allow custom ring tones to be assigned to specific telephone numbers, but the assignment of custom ring tones to specific numbers is not an automated process. In busy working and leisure environments in which it is often difficult to look at a ringing telephone or to have a unique ring tone for every potential calling party, it is difficult to efficiently and adequately screen incoming telephone calls to determine whether a particular call should be answered. Furthermore, ring tones, text-based and TTS-based caller identifications lack contextual information that may be of use to a user in a mobile telephone environment for determining whether to answer an incoming call, for example, a location of the calling party, a method of call, a gender of the calling party, scheduling information for the called party, and the like.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the invention solve the above and other problems by providing automated unique call announcements. When a call is received at a mobile or wired telephone, a variety of data about the calling party, for example, caller identification and profile data for the calling party and data associated with the called party, for example, scheduling data, contacts data, and contextual data, such as time of day, may be used for generating a text-to-speech message that may be played to the called party as a unique call announcement. If desired, a standard or customized ring tone may be played before, after, or before and after presentation of the unique call announcement. In addition, voice command functionality may be provided for allowing a called party to direct a disposition of an incoming telephone call without answering the incoming telephone call.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
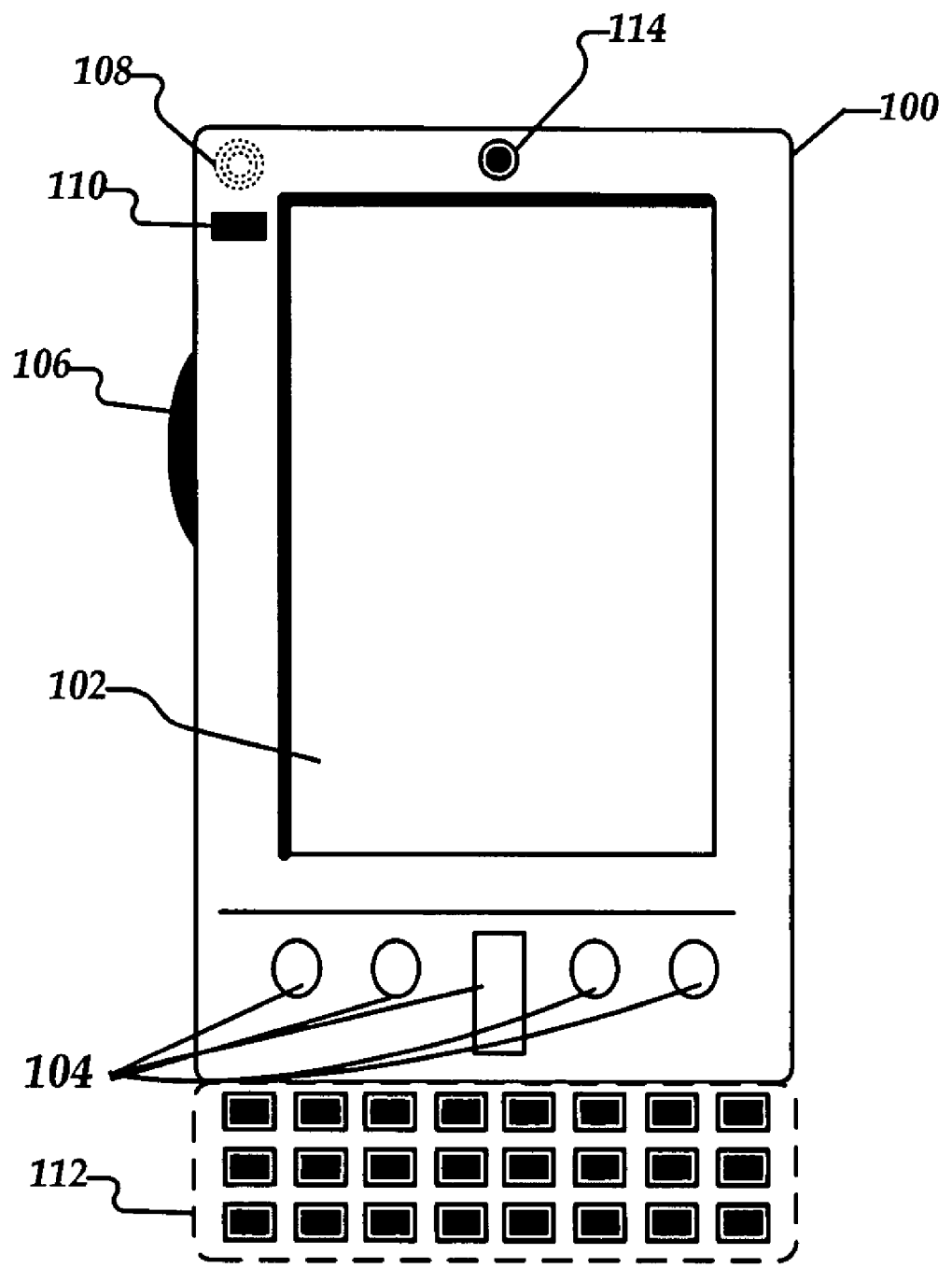
FIG. 1 is a diagram of an example mobile telephone/computing device.

As briefly described above, embodiments of the present invention are directed to providing automated unique call announcements (UCA) for incoming telephone calls for allowing a called party to adequately and efficiently screen incoming telephone calls prior to answering a particular incoming telephone call. According to embodiments of the invention, when an incoming telephone call is received at a mobile or wired telephone, a ring tone for the incoming telephone call is retrieved for provision to the called party via a speaker of the called party's mobile or wired telephone. As will be described below, the ring tone may be a standard ring tone provided by the called party's telephone, or the ring tone may be a customized ring tone that is customized for a particular calling party. After the retrieval of a ring tone for provision to the called party, information is retrieved about the calling party and about the called party that may be used for providing a unique call announcement that may be presented to the called party via a text-to-speech engine for allowing the called party to screen an incoming telephone call without having to look at the called party telephone.

Information gathered on the calling party and on the called party for providing an automated unique call announcement may include location information for the calling party, call data, contextual data, scheduling data, call urgency data, and the like. A configurable combination of these types of data may be used for providing a text-to-speech unique call announcement to the called party to allow the called party to more adequately and efficiently screen an incoming telephone call. For example, caller identification information for a calling party, location information for a calling party, and scheduling information for a called party may be gathered for an incoming telephone call to produce a unique call announcement such as "call from Bob Jones from his office at your appointed call time."

According to embodiments, the unique call announcement may be converted from text to speech by a text-to-speech (TTS) engine, and the call announcement may be presented to the called party instead of or in combination with a ring tone. Thus, the calling party may hear the unique call announcement for the calling party which will provide the called party with information about the incoming call to allow the called party to determine whether the incoming call should be answered.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

As briefly described above, embodiments of the present invention may be utilized for both mobile and wired telephones. For purposes of illustration, embodiments of the present invention will be described herein with reference to a mobile telephone 100 having a telephone system 200, but it should be appreciated that the components described for the mobile telephone 100 with its mobile telephone system 200 are equally applicable to a wired telephone having similar or equivalent functionality for providing unique call announcements described herein.

The following is a description of a suitable mobile device, for example, the camera phone or camera-enabled computing device, discussed above, with which embodiments of the invention may be practiced. With reference to FIG. 1, an example mobile computing device 100 for implementing the embodiments is illustrated. In a basic configuration, mobile computing device 100 is a handheld computer having both input elements and output elements. Input elements may include touch screen display 102 and input buttons 104 and allow the user to enter information into mobile computing device 100. Mobile computing device 100 also incorporates a side input element 106 allowing further user input. Side input element 106 may be a rotary switch, a button, or any other type of manual input element. In alternative embodiments, mobile computing device 100 may incorporate more or less input elements. For example, display 102 may not be a touch screen in some embodiments. In yet another alternative embodiment, the mobile computing device is a portable phone system, such as a cellular phone having display 102 and input buttons 104. Mobile computing device 100 may also include an optional keypad 112. Optional keypad 112 may be a physical keypad or a "soft" keypad generated on the touch screen display. Yet another input device that may be integrated to mobile computing device 100 is an on-board camera 114.

Mobile computing device 100 incorporates output elements, such as display 102, which can display a graphical user interface (GUI). Other output elements include speaker 108 and LED light 110. Additionally, mobile computing device 100 may incorporate a vibration module (not shown), which causes mobile computing device 100 to vibrate to notify the user of an event. In yet another embodiment, mobile computing device 100 may incorporate a headphone jack (not shown) for providing another means of providing output signals.

Although described herein in combination with mobile computing device 100, in alternative embodiments the invention is used in combination with any number of computer systems, such as in desktop environments, laptop or notebook computer systems, multiprocessor systems, micro-processor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

Figure 2:
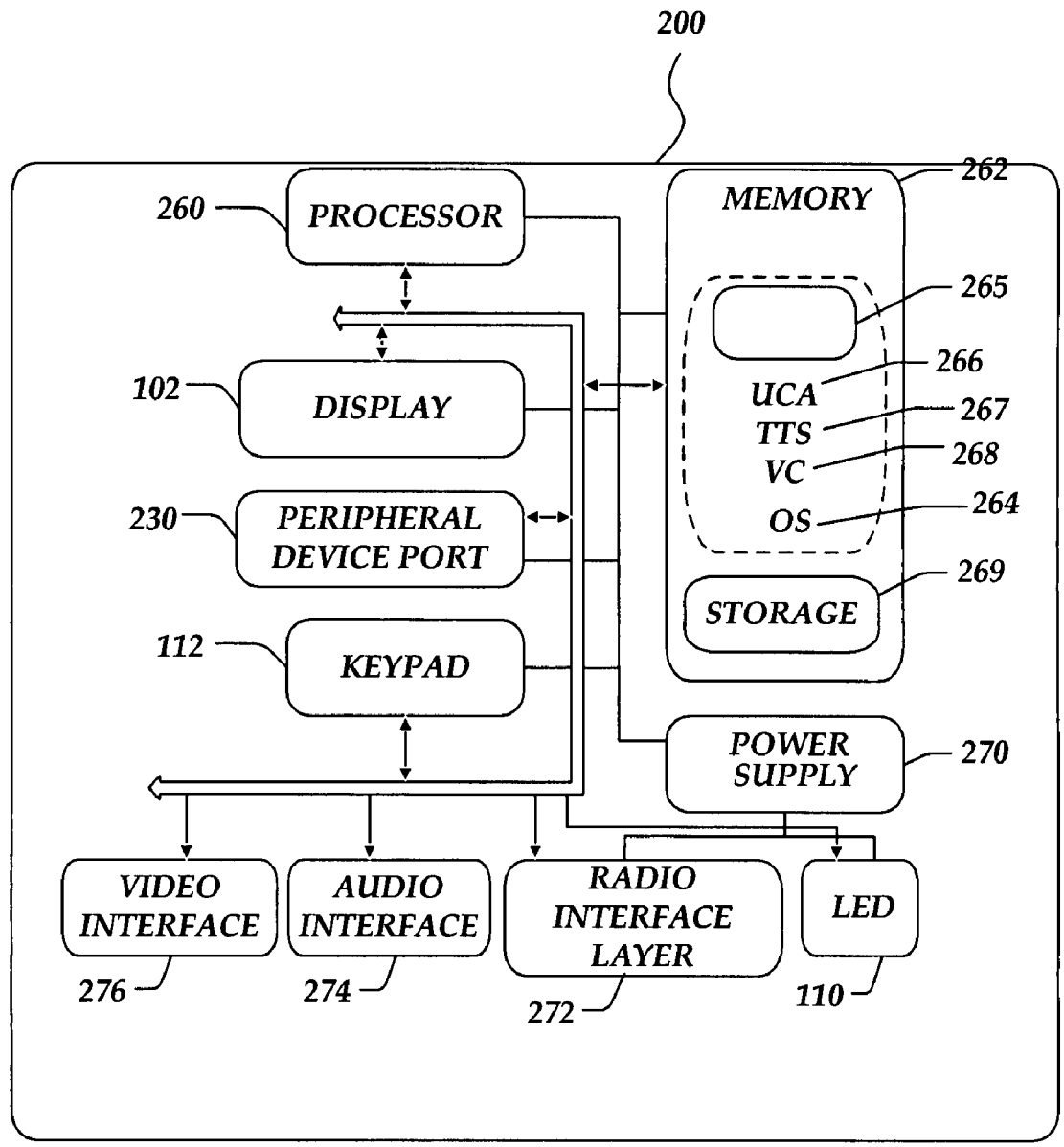
FIG. 2 is a block diagram illustrating components of a mobile telephone/computing device that may serve as an operating environment for the embodiments of the invention.

FIG. 2 is a block diagram illustrating components of a mobile computing device used in one embodiment, such as the mobile telephone/computing device 100 illustrated in FIG. 1. That is, mobile computing device 100 (FIG. 1) can incorporate system 200 to implement some embodiments. For example, system 200 can be used in implementing a "smart phone" that can run one or more applications similar to those of a desktop or notebook computer such as, for example, browser, email, scheduling, instant messaging, and media player applications. System 200 can execute an Operating System (OS) such as, WINDOWS XP®, WINDOWS MOBILE 2003® or WINDOWS CE® available from MICROSOFT CORPORATION, REDMOND, WASHINGTON. In some embodiments, system 200 is integrated as a computing device, such as an integrated personal digital assistant (PDA) and wireless phone.

In this embodiment, system 200 has a processor 260, a memory 262, display 102, and keypad 112. Memory 262 generally includes both volatile memory (e.g., RAM) and non-volatile memory (e.g., ROM, Flash Memory, or the like). System 200 includes an Operating System (OS) 264, which in this embodiment is resident in a flash memory portion of memory 262 and executes on processor 260. Keypad 112 may be a push button numeric dialing pad (such as on a typical telephone), a multi-key keyboard (such as a conventional keyboard), or may not be included in the mobile computing device in deference to a touch screen or stylus. Display 102 may be a liquid crystal display, or any other type of display commonly used in mobile computing devices. Display 102 may be touch-sensitive, and would then also act as an input device.

One or more application programs 265 are loaded into memory 262 and run on or outside of operating system 264. Examples of application programs include phone dialer programs, e-mail programs, PIM (personal information management) programs, such as electronic calendar and contacts programs, word processing programs, spreadsheet programs, Internet browser programs, and so forth. System 200 also includes non-volatile storage 268 within memory 262. Non-volatile storage 269 may be used to store persistent information that should not be lost if system 200 is powered down. Applications 265 may use and store information in non-volatile storage 269, such as e-mail or other messages used by an e-mail application, contact information used by a PIM, documents used by a word processing application, and the like. A synchronization application (not shown) also resides on system 200 and is programmed to interact with a corresponding synchronization application resident on a host computer to keep the information stored in non-volatile storage 269 synchronized with corresponding information stored at the host computer. In some embodiments, non-volatile storage 269 includes the aforementioned flash memory in which the OS (and possibly other software) is stored.

As briefly described above, the applications 265 may include a variety of applications useful in providing information with which an automated unique call announcement may be generated. For example, the applications 265 may include an electronic scheduling, calendaring, and contacts application, for example, MICROSOFT OUTLOOK, with which electronic mail, calendaring information, scheduling information and contacts information may be maintained by the called party on the called party telephone/computing device 100. For example, a contacts module of such an application may be used to store contact information for example, name, address, telephone number, and the like for a variety of contacts that may include calling parties from which the called party may receive an incoming telephone call. A calendaring or scheduling component of such an application may allow the called party to enter a variety of scheduling information, including appointments for meetings, for example, an appointment for which the called party may receive an incoming telephone call. Such contacts, calendaring and scheduling information may be stored at storage 269.

The applications 265 may include additional applications useful for providing unique call announcements. For example, a global positioning system (GPS) application for obtaining location information for the calling or called party may be provided. For example, if the calling party is calling from the mobile telephone/computing device 100, a global positioning system application may be utilized for determining a location of the calling party and for presenting that information to the called party for use in a unique call announcement. Other positioning systems may be utilized as alternates to a global positioning system. For example, an application programming interface (API) may be utilized in the mobile telephone 100 for calling a local or remote location service and for passing contact information or other identifying information for a calling party to a location service for returning location information for the called party.

The unique call announcement (UCA) module 266 is a software application operative to provide an automated unique call announcement. According to embodiments, when an incoming call is received, the unique call announcement module 266 is operative to retrieve a standard or unique ring tone and to retrieve information about the calling or called party for generation of a unique call announcement, as described herein. According to embodiments, the UCA module 266 may use information about the calling party received from and incoming call and information about both the calling party and the calling party maintained for both parties at the mobile telephone 100 or available via a local or remote information source, for example, Internet-based information sources accessible by the mobile telephone/computing device via a distributed network. An example of information about a calling party received with the incoming call includes caller identification information which is data that travels with the incoming call that identifies the calling party by telephone directory number, calling party name, address, or other identifying attributes.

The text-to-speech (TTS) engine 267 is a software application operative to receive text-based information from the unique call announcement module 266 and to generate an audible announcement from the received information. As is well known to those skilled in the art, the TTS engine 267 may access a large lexicon or library of spoken words, for example, names, places, nouns, verbs, articles, or any other word of a designated spoken language for generating an audible announcement for a given portion of text. The lexicon of spoken words may be stored at storage 269. According to embodiments of the present invention, once an audible announcement is generated from a given portion of text, the audible announcement may be played via the audio interface 274 of the telephone/computing device 100 through a speaker, earphone or headset associated with the telephone 100 for providing a unique call announcement to the called party. For example, if the call announcement module 266 passes a text item such as "call from Bob at his office" to the TTS engine 267, the TTS engine 267 may utilize a large lexicon of spoken words to generate an audible announcement of "call from Bob at his office" that may be played to the called party via a speaker on the telephone 100 or via an associated earphone or headset.

The voice command (VC) module 268 is a software application operative to receive audible input at the telephone 100 and to convert the audible input to a command that may be used to direct the functionality of the telephone 100 and to dispose of incoming telephone calls according to embodiments of the present invention. According to one embodiment, the voice command module 268 may be comprised of a large lexicon of spoken words, a recognition function and an action function. The lexicon of spoken words may be stored at storage 269. When a command is spoken into a microphone of the telephone/computing device 100, the voice command module 268 receives the spoken command and passes the spoken command to a recognition function that parses the spoken words and applies the parsed spoken words to the lexicon of spoken words for recognizing each spoken word. Once the spoken words are recognized by the recognition function, a recognized command, for example, "forward this call to Joe," may be passed to an action functionality that may be operative to direct the activities of the telephone 100. For example, a spoken phrase such as "forward this call to Joe," may be utilized by the voice command module to invoke the forwarding functionality of the telephone 100, to retrieve a forwarding telephone number for the "forwarded-to" party from a contacts database, and to cause the incoming telephone call to be forwarded, or otherwise processed as directed.

System 200 has a power supply 270, which may be implemented as one or more batteries. Power supply 270 might further include an external power source, such as an AC adapter or a powered docking cradle that supplements or recharges the batteries.

System 200 may also include a radio 272 that performs the function of transmitting and receiving radio frequency communications. Radio 272 facilitates wireless connectivity between system 200 and the "outside world", via a communications carrier or service provider. Transmissions to and from radio 272 are conducted under control of OS 264. In other words, communications received by radio 272 may be disseminated to application programs 265 via OS 264, and vice versa.

Radio 272 allows system 200 to communicate with other computing devices, such as over a network. Radio 272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 200 is shown with two types of notification output devices. The LED 110 may be used to provide visual notifications and an audio interface 274 may be used with speaker 108 (FIG. 1) to provide audio notifications. These devices may be directly coupled to power supply 270 so that when activated, they remain on for a duration dictated by the notification mechanism even though processor 260 and other components might shut down for conserving battery power. LED 110 may be programmed to remain on indefinitely until the user takes action to indicate the powered-on status of the device. Audio interface 274 is used to provide audible signals to and receive audible signals from the user. For example, in addition to being coupled to speaker 108, audio interface 274 may also be coupled to a microphone to receive audible input, such as to facilitate a telephone conversation. In accordance with embodiments of the present invention, the microphone may also serve as an audio sensor to facilitate control of notifications, as will be described below.

System 200 may further include video interface 276 that enables an operation of on-board camera 114 (FIG. 1) to record still images, video stream, and the like. According to some embodiments, different data types received through one of the input devices, such as audio, video, still image, ink entry, and the like, may be integrated in a unified environment along with textual data by applications 265.

A mobile computing device implementing system 200 may have additional features or functionality. For example, the device may also include additional data storage devices (removable and/or non-removable) such as, magnetic disks, optical disks, or tape. Such additional storage is illustrated in FIG. 2 by storage 269. Computer storage media may include volatile and nonvolatile, removable and non-removable media implemented in any method or technology for storage of information, such as computer readable instructions, data structures, program modules, or other data.

Figure 3:
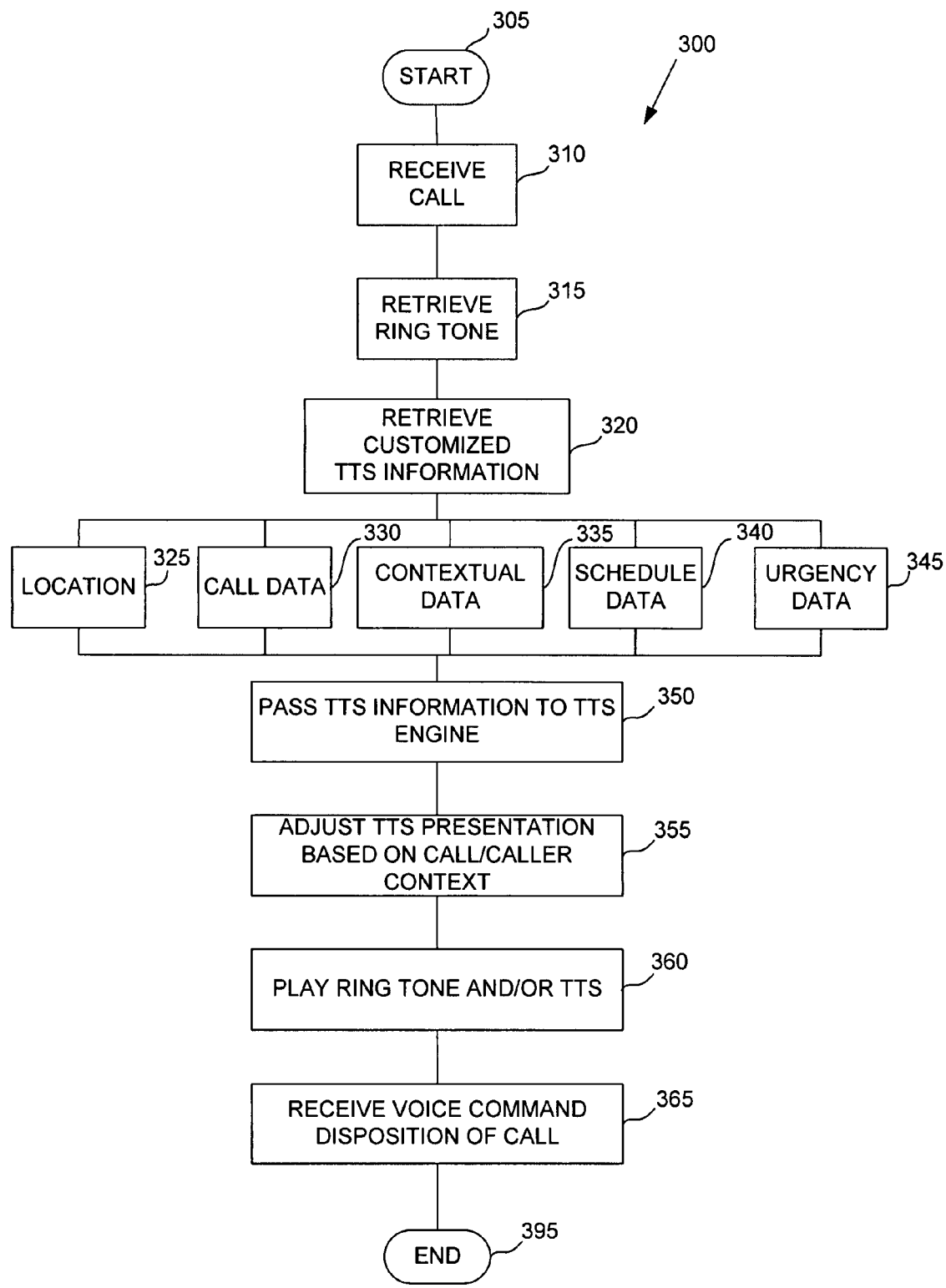
FIG. 3 is a logical flow diagram illustrating a method for providing automated unique call announcements.

Having described an operating environment for embodiments of the present invention above with respect to FIGS. 1 and 2, it is advantageous to describe an operational implementation to further illustrate embodiments of the present invention. FIG. 3 is a logical flow diagram illustrating a method for providing automated unique call announcements.

The routine 300 begins at start operation 305 and proceeds to operation 310 where an incoming call is received from a calling party on the telephone/computing device 100, described above. As described above, embodiments described herein are equally useful with a mobile or wired telephone/computing device 100. At operation 315, the unique call announcement (UCA) module 266 detects the incoming telephone call and briefly interrupts operation of the telephone/computing device 100 for preparation of and presentation of a unique call announcement.

At operation 315, the unique call announcement module 266 retrieves a standard or customized ring tone for the incoming call from storage 269. For example, if the called party has selected a standard ring tone for all incoming telephone calls, then the standard ring tone will be retrieved for presentation to the called party in association with the received call. On the other hand, if the called party has assigned a customized ring tone to one or more contacts, the unique call announcement module 266 may map caller identification for the incoming telephone call to a customized ring tone assigned to a contact maintained by the calling party that matches the caller identification of the incoming telephone call. Retrieval and presentation of a standard or customized ring tones for an incoming telephone call may be optional. For example, a unique TTS call announcement may be provided instead of a standard or customized ring tone. Alternatively, a standard or customized ring tone may be presented first to alert the calling party of an incoming telephone call, followed by the presentation of a TTS call announcement. Alternatively, a standard or unique ring tone may be presented briefly followed by the presentation of the TTS call announcement, followed by a final presentation of the standard or customized ring tone. For example, a standard or customized ring tone may be presented at a configured volume followed by a fading out (gradual reduction in volume) of the standard or customized ring tone, followed by a presentation of the TTS call announcement, followed by a fading in (gradual increase in volume) of the standard or customized ring tone.

At operation 320, the UCA module 266 retrieves information for generation of a unique call announcement that may be presented to the called party. At operation 325, the call announcement module 266 may utilize a location functionality for obtaining location information on the calling party, as described above. For example, a global positioning system (GPS) may be utilized at the calling party telephone 100 for generating a location of the calling party 100 and for transmitting the location information to the called party along with the incoming telephone call. Alternatively, the called party telephone 100 may utilize a location service for passing information known about the incoming calling party to obtain location information. For example, an application programming interface (API) may be utilized by the called telephone 100 for passing a caller identification of an incoming calling party to a location service, for example, an Internet-based location service for obtaining an address or physical location associated with a caller identification of the incoming calling party. In addition, the UCA module 266 may obtain location information for the incoming calling party by passing caller identification for the incoming calling party to a contacts database maintained by the called party in the storage 269 for obtaining location information for the calling party. For example, if the incoming telephone call matches the calling party's office, then the calling party's office may be returned as the location of the calling party for the incoming telephone call.

At operation 330, the UCA module 266 may obtain call data for the incoming call for use in generation and presentation of a unique call announcement. For example, call data may include the time and date of the call, a cell tower location at which the incoming call originated which may be used to further supplement the location information described above, a time zone in which the incoming call originates, and caller identification information for identifying the incoming call and for use in obtaining information about the incoming call, such as information contained in a contacts database by the called party. In addition, call data for the incoming call may include the last call time and date from the calling party and a last contact method, if known, for the calling party, for example instant messaging, electronic mail, telephone, etc. As should be appreciated, last contact method information may be maintained in the called telephone/computing device 100 in association with a caller identification for the incoming telephone call.

At operation 335, contextual data for the incoming telephone call may be obtained by the UCA module 266. According to embodiments, contextual data associated with the incoming telephone call may be obtained from a variety of sources. Contextual data may be attached to or tagged to the incoming call, for example, call data described above at operation 330. Contextual data may be obtained from sources, such as contacts databases, calendaring application databases, and the like. In addition, such contextual information may be obtained from local (on the device 100) sources or may be obtained from remote sources via a distributed network, such as an intranet or the Internet, via the radio 272. For example, identification information for the incoming telephone call may be used to search an Internet-based source for contextual information about the calling party.

Examples of contextual data may include a gender for the incoming telephone call which may be useful in generating and providing a unique call announcement, as described below. For example, the call announcement module 266 may map a caller identification for the incoming call to a contacts database for determining whether the incoming caller is male or female. Similarly, an age of the calling party and a nationality of the calling party may be obtained as contextual data for the incoming telephone call. For example, if it is known that the calling party associated with the incoming telephone call is an elderly male caller from Italy, the text-to-speech engine 267 may generate a unique call announcement using a synthesized elderly male voice with an Italian accent to provide a tonal uniqueness to the provided call announcement.

Other contextual data may be associated with other information such as scheduling information provided below. For example, if scheduling information associated with the calling party is known from the called party's scheduling data, and the scheduling information indicates that the calling party is calling at a time when the calling party is at a noisy outdoor event, for example, a sporting event, then the UCA 266 may adjust the unique call announcement accordingly. For example, if it is known that the calling party is calling from a scheduled event that is known to be noisy, then the UCA 266 may cause the telephone/computing device 100 to adjust the volume of the call announcement, or may provide synthesized outdoor activity noise to further provide unique qualities to the presented call announcement.

Additional contextual data may include a list of potential topics to discuss between the calling party and the called party based recent or past communications between the parties or based on scheduling data associated with the parties, described below. By obtaining such contextual data, a subject of a given call may be integrated into the call announcement. For example, a calling party, Bob, places a call to a called party, Joe. The UCA 266 may obtain data on a recent string of communications about a document the two parties are collaborating on, and the UCA may obtain an upcoming appointment for the two parties to produce an example announcement to the calling party of "Hello Bob, if this is about the document we are working on, press '1'; if it is about our 3:00 pm appointment, press '2'; or if it is personal, press '3.'" If the calling party presses '1', the called party may hear an announcement or receive a text-based notification of "Bob is calling about the document." Thus, the contextual nature of the announcements allows for helpful information to be passed between the calling and called parties without requiring the called party to answer the telephone call.

At operation 340, the call announcement module 266 may obtain scheduling information for the calling party via a calendar/scheduling application 265 that may be useful in providing a unique call announcement. For example, based on the time of an incoming call, the call announcement module 266 may review an electronic calendar or scheduling data for the called party for generating a unique call announcement. For example, if a caller identification associated with the calling party maps to a scheduled conference for the called party, a unique call announcement such as "call from Bob as scheduled at 1:00 p.m." may be provided via the TTS engine 267. In addition, scheduling data may be provided for the calling party via the calling party's telephone/computing device 100. That is, in addition to caller identification and other call data for the incoming call, scheduling data for the calling party may be provided with the call which, in turn, may be used by the call announcement module 266. For example, if the incoming call includes scheduling data showing that the calling party will be in a meeting in thirty minutes, then a unique call announcement may be provided such as "call from Bob, his next meeting begins in thirty minutes" so that the called party may decide not to answer the incoming call, but will know from the unique call announcement that the calling party will be in a meeting thirty minutes from now.

In addition, scheduling information may be useful for adjusting or providing tonal characteristics to a call announcement. For example, if it is known from scheduling data from a calling party that the calling party is calling from his office, synthesized or canned office-type sounds may be provided as background for the call announcement to provide interesting context for the call announcement. For another example, if it is known that the calling party is at a sports event, synthesized or canned noise associated with sporting events may be played as background sounds to the call announcement to provide interesting contextual qualities to the call announcement. For another example, if it is known that the called party must be at a dental appointment in ten minutes, an announcement may be provided that alerts the calling party that he must attend his dental appointment which may impact his decision as to whether to answer the incoming call. For example, a unique call announcement such as "call from Sarah, your dental appointment begins in five minutes" may be provided for providing a scheduling context to the incoming telephone call.

At operation 345, any urgency data applicable to an incoming call may be utilized by the call announcement module 266 for providing a unique call announcement. For example, if the calling party applies an urgency factor to the incoming call, or if scheduling data from the incoming call or from the called party's scheduling information indicates that calls from this calling party are of a certain urgency nature, this information may be useful in providing the unique call announcement. For example, if a call is received from a calling party that is marked as urgent, a unique call announcement may be provided such as "urgent call from Jim, he will be departing for New York in one hour."

At operation 350, the call announcement module 266 passes any textual data or information gathered for the incoming call, as described above for operations 325-345, to the TTS engine 267 for generation of an audible unique call announcement that may be provided to the called party. According to embodiments, the textual information provided to the TTS engine may be structured by the UCA module 266 before the information is passed to the TTS engine. For example, the information passed to the TTS engine may be structured according to a variety of useful structuring languages, such as the Extensible Markup Language (XML) for associating various tagged components of a text string with information obtained in association with an incoming telephone call. For example, a canned text string such as "call from <name>, <gender-based pronoun> is calling from <location>." Such a structured text string may then be populated by the UCA module 266 by inserting a name for the calling party in the name tag, a gender-based pronoun, for example, he, she, his, her, for the gender-based pronoun tag and a location of the calling party for the location tag. The populated text string may then be passed to the TTS engine 267 for generation of an audible version of the text string for presentation as a unique call announcement. As should be appreciated, the example marked up text string is for purposes of illustration only and is not intended to illustrate a well-formed mark up language text string, such as may be available according to XML.

At operation 355, the generated TTS announcement may be adjusted based on call/caller context information obtained by the UCA module 266, as described above. For example, if it is determined that the calling party is a young female, the TTS string may be generated with a synthesized or canned young female voice for providing a contextual quality to the played announcement. For another example, if it is known that the calling party is calling from a noisy sporting event, as described above, the synthesized or canned background noise typically associated with an outdoor sporting event may be applied to the TTS announcement for providing contextual tonal qualities to the call announcement. In addition to the examples described above, other tonal qualities that may be provided include tonal qualities based on the time of day of a call. For example, if an incoming call is received at night, a whisper type voice volume and quality may be used for the call announcement.

According to an embodiment, the TTS call announcements described herein may be configurable by the called party by programming the UCA module 266. For example, a given called party may program the UCA module 266 to provide unique call announcements with only caller identification information and free/busy schedule information. Thus, call announcements according to this configuration would contain only an identification of the calling party and any available free/busy scheduling information for the calling party. For example, such a call announcement may be provided as "call from Bob Brown on cell, his next meeting is in five minutes." Another calling party may configure the call announcement module 266 to provide call announcements containing caller identification plus a friendly name for the calling party, if available, plus a location of the calling party. An example of such a call announcement may include "call from mom at work." Another configurable call announcement may include caller identification information plus call history, if available. An example of such a call announcement may include "this is the fifth call from Joe Green in thirty minutes."

Another configurable call announcement may include caller identification plus scheduling information for the called party. An example of such a call announcement may include "call from Sarah as scheduled at 2:00 p.m." Another example call announcement configuration may include caller identification information plus urgency information. An example of such a call announcement may include "urgent call from Frank." As should be appreciated, the example configurations, described herein, are for illustration purposes only and are not limiting of the vast numbers of different types of call announcement configurations that may be used. For example, one configuration may omit caller identification information and provide only scheduling information. An example of such a call announcement may include "this is your 2:00 p.m. call." Alternatively, the configuration of a given call announcement may be decided by the UCA module 266 based on available information for generating a unique call announcement. For example, if the call announcement module 266 is able to obtain caller identification information, scheduling information and location information associated with the incoming call, then a call announcement may be configured to include each of these types of information.

At operation 360, after the TTS-based unique call announcement is generated according to the information obtained for the TTS presentation and according to any tonal adjustments configured for or desired for the TTS presentation, the TTS presentation may be provided to the called party as a unique call announcement. As described above, in addition to the unique call announcement, a standard or customized ring tone may be provided before, after or before and after the provision of the unique call announcement, or the ring tone may be omitted altogether, and the unique call announcement may be provided as the only indication of the incoming call.

At operation 365, according to one embodiment, the voice command module 268 may be utilized by the called party to dispose of the incoming call. For example, if the called party decides to forward the incoming call to another person based on the content of the unique call announcement, the called party may speak a call forwarding voice command into a microphone of the telephone/computing device 100 for issuing a voice command to the voice command module 268. For example, the called party may determine that the incoming call is best handled by another person based on information provided in the unique call announcement. Thus, the called party, rather than answering the incoming call, may speak the words "forward this call to Tom." The voice command module 268 will receive the words spoken by the called party and will pass the received words to a speech recognition function based on a lexicon of words and commands for preparing an actionable command that may be used in disposing of the call. For example, based on the spoken command "forward this call to Tom," the voice command module 268 may automatically forward the incoming call to the designated person. According to one embodiment, the called party may command the UCA module 266 via key press via dual tone, multi-frequency (DTMF) key tone recognition.

Alternatively, the voice command module 268 may be configured for presenting a TTS command back to the called party to verify the command is understood by the voice command module 268. For example, in response to the command "forward this call to Tom," the voice command module 268 may present a TTS announcement back to the commanding called party such as "do you want to forward this call to Tom?" If the voice command presented back to the commanding called party is accurate, the called party may respond according to any number of suitable means, for example, by speaking an audible command back to the voice command module 268 such as "yes" or "no" or by selecting a key from the telephone/computing device 100 such as numeral one, pound, star, or the like. After the unique call announcement and any associated ring tone is provided to the called party, as described, and after any voice command provided by the called party is processed, the routine ends at operation 395.

Advantageously, according to embodiments of the present invention, a called party may receive a unique call announcement that obviates a need for the called party to remove his/her eyes from a current task when an incoming call is received and obviates a need for a called party to program customized ring tones for various calling parties. If a call is not answered by the called party, contextual information provided in the unique call announcement will greatly enhance the information available to the called party in determining whether and when to return the call. In addition, contextual information is useful to visually impaired users who may learn interesting and valuable contextual information about an incoming call whether or not the incoming call is answered.

It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A method of providing a unique call announcement for an incoming telephone call, comprising:
   receiving an indication of an incoming telephone call;
   retrieving information about the incoming telephone call;
   obtaining contextual data for the incoming telephone call, the contextual data comprising one or more of the following associated with the incoming telephone call: gender data, age data, nationality data, and a list of potential topics to discuss between a calling party and a called party based on previous communications between the calling party and the called party, wherein the contextual data is attached to the incoming telephone call;

generating, using the contextual data, a unique call announcement containing the information retrieved about the incoming telephone call, the unique call announcement comprising a synthesized voice in an accent corresponding to a nationality of the calling party in the nationality data; and presenting the unique call announcement as a notification to a called party of the incoming telephone call.

2. The method of claim 1, further comprising providing a ring tone immediately before, immediately after, or immediately before and after presenting the unique call announcement.

3. The method of claim 2, wherein providing the ring tone immediately before, immediately after, or immediately before and after presenting the unique call announcement includes providing a custom ring tone having tonal qualities customized in association with information about the incoming call.

4. The method of claim 1, wherein presenting the unique call announcement as a notification to a called party of the incoming telephone call includes presenting the unique call announcement as an audible notification to a called party of the incoming telephone call.

5. The method of claim 4, prior to presenting the unique call announcement as an audible notification to a called party of the incoming telephone call, converting a text-based version of the unique call announcement to an audible version of the unique call announcement for providing to a called party.

6. The method of claim 1, wherein retrieving information about the incoming telephone call includes retrieving location data for a calling party associated with the incoming call for providing a location of the calling party as part of the unique call announcement.

7. The method of claim 1, wherein retrieving information about the incoming telephone call includes retrieving a date and time of the incoming call for customizing the unique call announcement based on the date and time of the incoming call.

8. The method of claim 1, wherein retrieving information about the incoming telephone call includes retrieving scheduling data for the called party for customizing the unique call announcement based on a relationship between the incoming call and scheduling data for the called party.

9. The method of claim 8, wherein retrieving information about the incoming telephone call includes receiving scheduling data for the calling party for customizing the unique call announcement based on a relationship between the scheduling data for the calling party and scheduling data for the called party.

10. The method of claim 1, wherein retrieving information about the incoming telephone call includes receiving urgency data associated with the incoming call for customizing the unique call announcement based on an urgency of the incoming call.

11. The method of claim 1, further comprising adjusting one or more tonal attributes of the unique call announcement based on information retrieved about the incoming telephone call.

12. The method of claim 1, further comprising receiving one or more instructions from a called party for disposing of the incoming telephone call based on information retrieved about the incoming telephone call.

13. The method of claim 12, wherein receiving one or more instructions from a called party includes receiving one or more instructions from a called party via voice commands from the called party.

14. The method of claim 12, wherein receiving one or more instructions from a called party includes receiving one or more instructions from a called party via keypad key entry.

15. A computer readable medium containing computer executable instructions which when executed by a computer perform a method of providing a unique call announcement for an incoming telephone call, comprising:

retrieving information about an incoming telephone call;

obtaining contextual data for the incoming telephone call, the contextual data comprising one or more of the following associated with the incoming telephone call: gender data, age data, nationality data, and a list of potential topics to discuss between a calling party and a called party based on previous communications between the calling party and the called party, wherein the contextual data is attached to the incoming telephone call;

generating, using the contextual data, a unique call announcement containing the information retrieved about the incoming telephone call, the unique call announcement comprising a synthesized voice in an accent corresponding to a nationality of the calling party in the nationality data;

presenting the unique call announcement as a notification to a called party of the incoming telephone call; and providing a ring tone immediately before, immediately after, or immediately before and after presenting the unique call announcement.

16. The computer readable medium of claim 15, wherein providing the ring tone immediately before, immediately after, or immediately before and after presenting the unique call announcement includes providing a custom ring tone having tonal qualities customized in association with information about the incoming call.

17. The computer readable medium of claim 15, wherein presenting the unique call announcement as a notification to a called party of the incoming telephone call includes presenting the unique call announcement as an audible notification to a called party of the incoming telephone call.

18. The computer readable medium of claim 15, further comprising adjusting one or more tonal attributes of the unique call announcement based on information retrieved about the incoming telephone call.

19. The computer readable medium of claim 15, further comprising receiving one or more instructions from a called party for disposing of the incoming telephone call based on information retrieved about the incoming telephone call.

20. A system for providing a unique call announcement for an incoming telephone call, comprising:

a unique call announcement module operative to receive an indication of an incoming telephone call;

to retrieve information about the incoming telephone call;

to obtain contextual data for the incoming telephone call, the contextual data comprising one or more of the following associated with the incoming telephone call: gender data, age data, nationality data, and a list of potential topics to discuss between a calling party and a called party based on previous communications between the calling party and the called party, wherein the contextual data is attached to the incoming telephone call;

to generate, using the contextual data, a unique call announcement containing the information retrieved about the incoming telephone call, the unique call announcement comprising a synthesized voice in an accent corresponding to a nationality of the calling party in the nationality data;
to pass the unique call announcement to a text-to-speech system for generating an audible version of the unique call announcement; and
to play the audible version of the unique call announcement as a notification to a called party of the incoming telephone call.

* * * * *